United States Patent [19]

Moffitt

[11] Patent Number: 4,895,053

[45] Date of Patent: Jan. 23, 1990

[54] IGNITION ENABLING-DISABLING DEVICE

[75] Inventor: John M. Moffitt, Wichita, Kans.

[73] Assignee: J. I. Case Company, Racine, Wis.

[21] Appl. No.: 297,660

[22] Filed: Jan. 17, 1989

[51] Int. Cl.[4] .............................................. B60K 41/18
[52] U.S. Cl. .................................... 74/850; 200/61.91
[58] Field of Search ......................... 74/850; 200/61.91

[56] References Cited

U.S. PATENT DOCUMENTS

| 3,410,970 | 11/1968 | Raab | 200/61.91 |
|---|---|---|---|
| 3,534,637 | 5/1969 | Tomlinson | 74/850 |
| 3,811,020 | 5/1974 | Johnson et al. | 74/850 X |
| 3,857,298 | 12/1974 | Case et al. | 74/850 X |
| 4,321,980 | 3/1982 | Nissen | 180/333 |
| 4,491,039 | 1/1985 | Benedek et al. | 74/850 |
| 4,541,307 | 9/1985 | Bellah | 74/850 |
| 4,553,448 | 11/1985 | Youngers et al. | 74/480 |
| 4,821,605 | 4/1989 | Dzioba | 74/850 |

Primary Examiner—Dirk Wright
Attorney, Agent, or Firm—Peter N. Jansson, Ltd.

[57] ABSTRACT

A device for closing an ignition-enablement switch only if a drive control is in neutral position includes a stop member, a switch mount and a closing member each biased toward its position of engagement with the stop member and movable to positions displaced therefrom, the switch mount having the switch on it such that it is closed by the closing member only when the closing member and switch mount are both in their stop-engaging positions, and an actuator mechanism movable with the drive control between positions displacing the closing member and positions displacing the switch mount, through a position displacing neither. The device may be integrated with the drive control, with major parts pivotable about the control axis. Or the device may be attached to the drive control by a link arm, with major parts pivotable about a separate axis.

18 Claims, 4 Drawing Sheets

IGNITION ENABLING-DISABLING DEVICE

FIELD OF THE INVENTION

This invention is related generally to ingition enabling-disabling devices for vehicles and implements and, more particularly, to mechanisms for insuring that drive controls are in a neutral condition when such vehicles and implements are started.

BACKGROUND OF THE INVENTION

The need for ignition enablement-disablement devices for a variety of equipment is well known. Such devices serve to make ignition of drive engines impossible unless the drive controls are in a neutral condition. These devices are used in connection with vehicle transmissions, in connection with drive controls for various implements powered by vehicle drive engines, and on drive controls for a variety of other powered mechanisms.

A good example of the sort of equipment for which such ignition enablement-disablement devices are highly important is the hydrostatic drive controls for a trencher. It is required that ignition of the drive engine be disabled for such equipment unless the trencher mechanism and vehicle transmission are in neutral. Such ignition disablement devices serve to prevent unintended lurching movements of the vehicle and/or the trencher.

A wide variety of devices are used for ignition enabling-disabling purposes. Some of such devices include what may be referred to as neutral start switches, that is, an electrical switch which is in a closed position only when the drive control is in a neutral position. This invention is an improvement in ignitiion enablement-disablement devices of the type having neutral start switches.

Some of the prior devices of this type have significant disadvantages and drawbacks. Certain devices are cam operated, and because of vibration, dirt and other conditions, such devices are often susceptible to excessive wear which can lead to breakage of parts and possible malfunction. Some devices require location in particular positions vis-a-vis the drive control, in some cases limiting their application. Some devices are located in rather inaccessible positions which, among other things, make maintenance problematic. Some devices are rather complex in structure and operation.

There is a need for an improved simple and effective device which renders the starting circuit inoperative whenever a drive control is out of its neutral position.

OBJECTS OF THE INVENTION

It is an object of this invention to provide an improved ignition enabling-disabling device overcoming some of the problems and shortcomings of the prior art.

Another object of this invention is to provide an improved ignition enabling-disabling device which is less susceptible to wear and breakage than certain ignition enablement-disablement devices of the prior art.

Another object of this invention is to provide an improved ignition enabling-disabling device which is simple in construction and operation and is highly reliable.

Another object of this invention is to provide an improved ignition enabling-disabling device which can be located in a readily accessible position.

Another object of this invention is to provide an improved ignition enabling-disabling device which can be located in a variety of convenient locations with respect to its drive control.

These and other important objects will be apparent from the descriptions of this invention which follow.

SUMMARY OF THE INVENTION

The present invention provides an improved mechanism for rendering an ignition circuit inoperative whenever the drive control is in an engaged position, rather than neutral, position. The device of this invention overcomes some of the problems and shortcomings of the prior art. The device of this invention is of the type having means for closing an ignition-enablement switch if and only if a drive control is in neutral position.

The invention has application in a wide variety of vehicles and implements. For example, the device is useful in mechanisms for trenching.

The device of this invention includes: a stop member having first and second stops; a switch mount movable between a position engaging the second stop and positions displaced therefrom; a closing member movable between a position engaging the first stop and positions displaced therefrom; an ignition enabling-disabling switch positioned on the switch mount such that it is closed by the closing member only when the closing member and switch mount are both in the stop-engaging positions; means biasing the switch mount and closing member toward the stop-engaging positions; and actuator means movable with the drive control between positions displacing the closing member and positions displacing the switch mount, through a position displacing neither.

One embodiment is a "remote" version of the invention. Its actuator means includes an actuator member which is separate from the drive control, and a link arm which interconnects the drive control and the actuator member to impart movement in a manner hereafter described.

Another embodiment is a "direct-mounted" version of the invention. Its actuator means includes a control member which is part of the standard drive control (which is typically a drive plate), and such control member has a rigidly affixed actuator piece directly which is in position to be engageable with the switch mount and the closing member, as hereafter described.

In all preferred embodiments, the stop member is in fixed position with respect to the vehicle or other implement. The first and second stops of such stop member face in divergent opposite directions. For example, if the first stop faces upwardly to engage a downwardly moving closing member, then the second stop faces downwardly to engage an upwardly moving switch mount. Thus, when the movement of the closing member and switch mount is a pivoting movement, as is preferred, such closing member and switch mount move in a scissors like action with the stop member and actuating member between facing edges of such closing member and switch mount.

As noted, the closing member and the switch mount are preferably both pivotable. Such pivotability for both parts is preferably about a first pivot axis, that is, a single axis. In such embodiments, the first and second stops of the stop member are radially spaced from the first pivot axis, and displacement of the closing member and switch mount is by pivoting in opposite directions around the first pivot axis.

In highly preferred embodiments, the actuator means comprises an actuator member which, like the closing member and switch mount, is pivotable about the first pivot axis.

As already noted, in certain preferred embodiments the stop member is in fixed position. In certain highly preferred embodiments of this type, such stop member has an opening which defines the first pivot axis. In certain "remote mounted" embodiments of the invention, the stop member thus becomes the base member for the whole structure; that is, all rotatable parts are rotatably attached thereto.

In certain preferred embodiments of the type having pivotable members, the stop member has a radially-extending major portion and a stop portion transverse to such major portion and located at a first radial distance from the pivot axis. Such stop portion is in position to intersect pivot movements of the switch mount and the closing member. Likewise, the actuator member has a radially-extending major portion and an actuator portion transverse to such major portion and located at a second radial distance from the pivot axis. Such actuator portion, like the stop portion, is in position to intersect pivot movements of the switch mount and the closing member.

Referring again to direct-mounted versions of this invention, the actuator means includes a control member which is part of the standard drive control for the implement or vehicle. The control membe is pivotable about the pivot axis of the switch mount and closing member. And, as noted, the control member has a rigidly affixed actuator piece directly engageable with the switch mount and the closing member.

Referring again to certain "remote mounted" versions of this invention, the drive control includes a control member (a standard drive control part manipulated by levers) pivotable about a second pivot axis which is spaced from the first pivot axis. The actuator means includes the actuator member mentioned above, which pivots about the first pivot axis, and a link arm which extends between the control member and the actuator member. The end of the link arm attached to the control member may be attached at a position which is a selected radial distance from the second pivot axis. The point of attachment chosen will affect the sensitivity of operation. That is, a greater radius will increase sensitivity and vice versa.

Such sensitivity setting may be determined in product design, and not by operator choice. A sensitivity setting readily adjustable by the operator is provided by adjustable attachment of the switch to the switch mount. By slight adjustment of the switch position the range of neutral-condition ignition enablement can readily be increased or decreased.

DETAILED DESCRIPTION OF PREFERRED EMBODIMENTS

The drawings illustrate two preferred embodiments of this invention. These include a remote-mounted ignition enablement-disablement device 10 illustrated in FIGS. 1–8 and a somewhat similar direct-mounted device 12 illustrated in FIGS. 9 and 10. Like parts in these two embodiments are identified by like numerals throughout the drawings.

The terms "remote-mounted" and "direct-mounted" refer to the nature of the relationship between the drive control and the ignition enablement-disablement devices of this invention. This difference will be explained by reference to situations, as in both illustrated embodiments, in which the drive control is a pivoting control plate. Such control plate, of course, has normal linkages attached to it which extend, for example, to a variable displacement hydraulic pump. The "direct-mounted" device is operated by direct contact of a rigid extension from such control plate. The "remote-mounted" device has a mechanical link which extends rrom such control plate.

Figure 1:
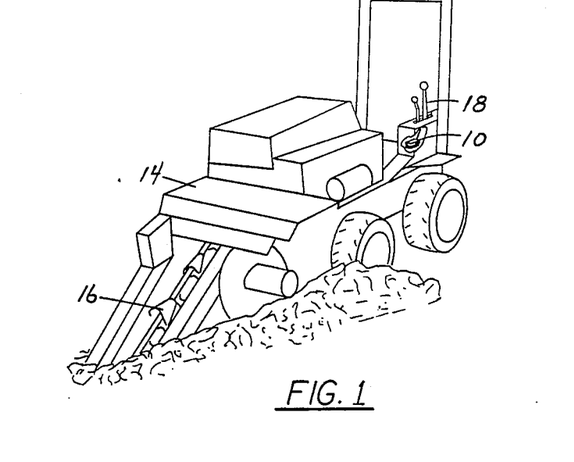
FIG. 1 is perspective view of a trenching mechanism, the view having a broken-away portion revealing an ignition enabling-disabling device in accordance with this invention.

Referring now to FIG. 1, a tractor 14 is shown having a trencher attachment 16 affixed to it. The drive engine of tractor 14 serves to power both tractor 14 and trencher 16. Tractor 14 includes a hydrostatic drive control 18 which is manipulated by the operator between forward and reverse positions, through a neutral position. The extent of displacement from the neutral position determines the rate of forward or reverse operation.

By virtue of the device of this invention, drive control 18 must be in a neutral position in order to allow ignition of the tractor engine. In each of the two embodiments of the ignition enablement-disablement device of this invention which are illustrated in the drawings, a control plate 20, often referred to herein as "control member," forms a principal part of drive control 18. Control plate 20 pivots about an axis, as hereafter described, between forward and rearward positions, in each case moving through a neutral position.

Remote-mounted device 10 is illustrated more specifically in FIGS. 2–8.

Device 10 includes a fixed stop member 24 which is rigidly attached to tractor 14 by means of a mounting portion 26. Stop member 24 has a major portion 28 which includes an opening 30 defining a first pivot axis 32. Extending through opening 30 and along first pivot axis 32 is a bolt 34 which has a threaded portion 36 and a head 38. A nut 40 is secured on threaded portion 36 such that bolt 34 becomes the pivot shaft for other portions of device 10. Major portion 28 of mounting portion 26 extends radially away from first pivot axis 32 and terminates in a stop portion 42 which is transverse to major portion 28 at a first radial distance from first pivot axis 32. Transverse stop portion 32 includes upper and lower edges which form first and second stops 44 and 46, respectively, the purpose of which is hereafter described.

Three different members are pivotably mounted on bolt 34 to pivot about first pivot axis 32. Two of these members are rather similar—switch mount 48 and closing member 52. Their relative rotational positions determines whether a switch 62 mounted on switch mount 48 is closed or open. As hereafter explained, only when the drive control is in a neutral position will switch 62 be closed, thereby enabling ignition.

Switch mount 48, which is pivotable about axis 32, extends radially therefrom along and generally parallel to major portion 28 of stop member 24. Switch mount 48 includes a terminal portion 50 which extends below second stop 46, that is, the lower edge of stop portion 42, previously described. The positions of terminal portion 50 and second stop 46 along axis 32 are such that second stop 46 intersects pivot movements of switch mount 48. Thus, switch mount 48 is pivotable between a position engaging second stop 46 and positions displaced therefrom.

In similar manner, a closing member 52, which is generally a mirror-image of switch mount 48 in shape, is pivotable about first pivot axis 32 and has a terminal portion 54 positioned for contact with first stop 44, that is, the upper edge of stop portion 42, previously described. Thus, closing member 52 is pivotable between a position engaging first stop 44 and positions displaced therefrom.

The displacement of closing member 52 from stop portion 42 is in a direction opposite from the displacement of switch mount 48 from stop portion 42. First and second stops 44 and 46 of stop portion 42 face in divergent opposite directions.

A coil spring 56 serves to bias switch mount 48 and closing member 52 to their respective positions of engagement with stop portion 42 of stop member 24. Spring 56, which is shown best in FIGS. 2 and 3, extends loosely around bolt 34 and has an upper end 58 positively engaged with closing member 52 and a lower end 60 positively engaged with switch mount 52. Any displacement of either closing member 52 or switch mount 48 is against the biasing force of spring 56.

Switch 62, previously mentioned, is fixedly attached to switch mount 48 on one lateral surface thereof. Switch 62 includes a depressible switch button 63 which is positioned to be depressed by closing member 52 only when closing member 52 and switch mount 48 are both engaged with first and second stops 44 and 46. More specifically, closing member 52 includes an overhang portion 53 which is positioned for engagement with switch button 63 when and only when both closing member 52 and switch mount 48 are engaged with stop portion 42 of stop member 24. This occurs only when control plate 20 of the drive control is in its neutral position.

Figure 2:
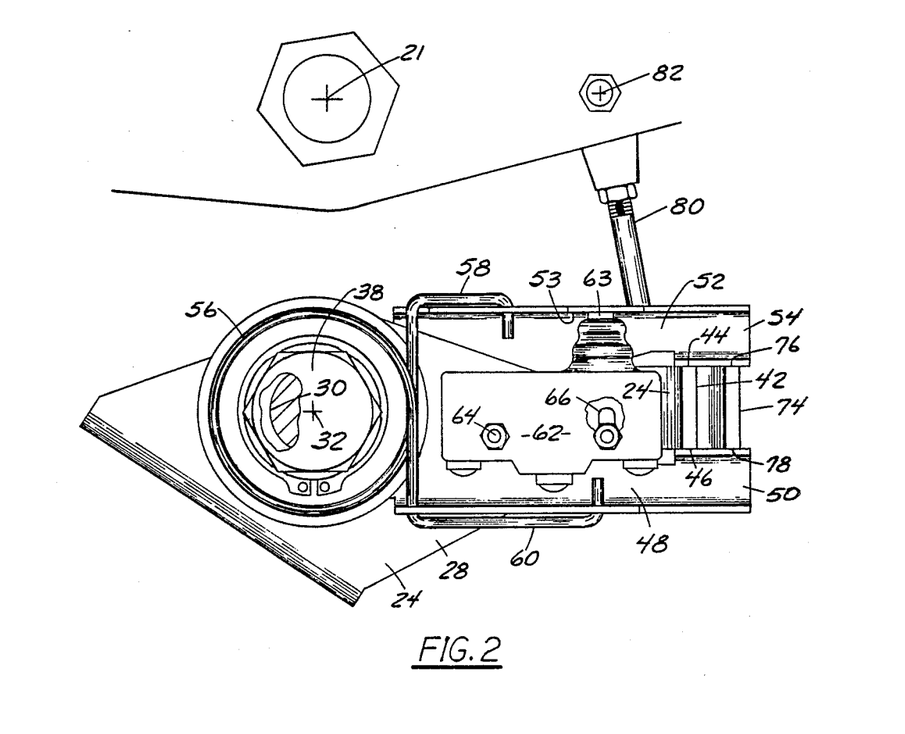
FIG. 2 is an enlarged front elevation of the ignition enabling-disabling device of FIG. 1 and the associated apparatus.
Figure 3:
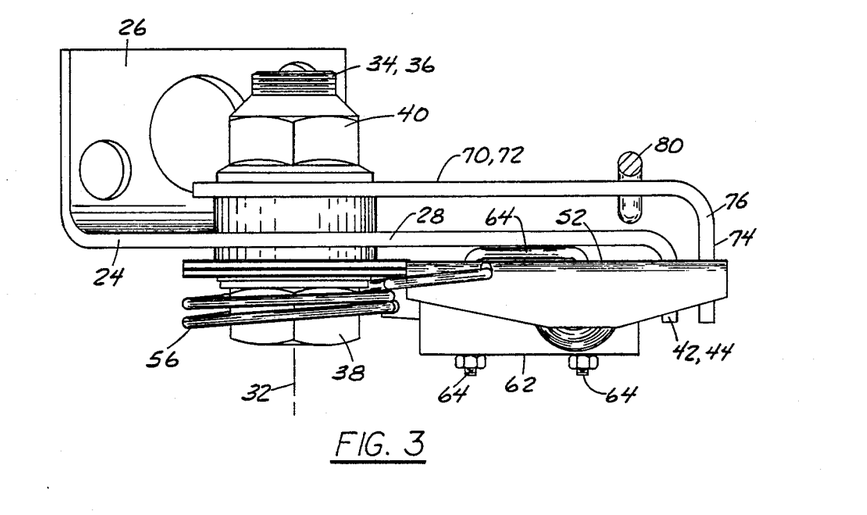
FIG. 3 is top plan view of the device of FIG. 2.
Figure 4:
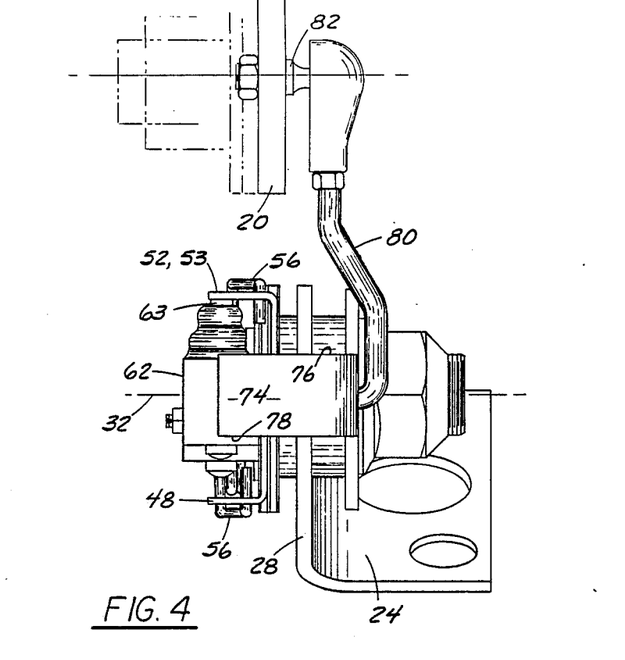
FIG. 4 is right side elevation of FIG. 2.
Figure 5:
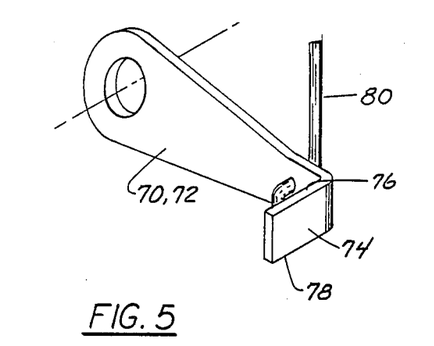
FIG. 5 is a reduced perspective view of the actuating mechanism of the device of FIGS. 1–4.

The attachment of switch 62 to switch mount 48 is by means of a U-shaped member 64. The ends of the legs of U-shaped member 64 are seen in FIG. 2. One of such legs extends through a hole (not shown) in switch mount 48 and from there through switch 62, while the other leg extends through a slot 66, shown in FIG. 2, and from there through switch 62. Nuts draw switch 62 firmly against switch mount 48. The position of switch 62 on switch mount 48 may be adjusted slightly by loosening the nuts and moving U-shaped member to a different position in slot 66. Such adjustment changes the sensitivity of the device.

As noted there are three different members which are pivotably mounted on bolt 34 to pivot about first pivot axis 32. In addition to switch mount 48 and closing member 52, which are pivotable, device 10 includes an actuator member 70 which is pivotable about first pivot axis 32.

Actuator member 70 has a major portion 72 which is parallel to major portion 28 of stop member 24. Major portion 72 extends radially away from first pivot axis 32. Actuator member 70 terminates in an actuator portion 74 which is transverse to major portion 72 at a second radial distance from first pivot axis 32. The second radial distance is greater than the first radial distance, mentioned above, which is the position of stop portion 42 of stop member 24. Thus, actuator portion 74 is radially beyond stop portion 42. Transverse actuator portion 74 has upper and lower edges 76 and 78 positioned to be engageable with closing member 52 and switch mount 48, respectively. Thus, actuator portion 74 is positioned to intersect pivot movements of switch mount 48 and closing member 52. Actuator portion 74 of actuator member 70 and stop portion 42 of stop member 24 are in parallel planes and are dimensioned to have equal top-to-bottom dimensions.

Actuator member 70 is connected to control plate 20 by means of a link arm 80. Link arm 80 is pivotably secured to control plate 20 by pivot connection 82 and, at its opposite end, has a laterally-extending portion 84 pivotably engaging a hole in major portion 72 of actuator member 70. Thus, pivoting movement of control plate 20 about its pivot axis (or point) 21 (see FIGS. 2, 4, and 6-8) results in pivoting movement of actuator member 70. Pivot axis 21 of control plate 20 is parallel to and spaced from first pivot axis 32.

The operation of device 10 will be explained by reference to FIGS. 6-8.

Figure 7:
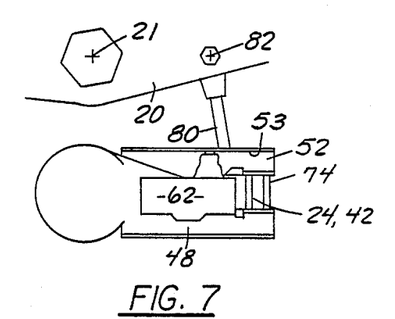
FIG. 7 is a similar schematic view, illustrating, however, an ignition-enabling position in which the switch is closed because the drive control is in the neutral position.

When control plate 20 is in its neutral position, as illustrated in FIG. 7, actuator member 70 is held in a position such that its actuator portion 74 is between switch mount 48 and closing member 52 with neither switch mount 48 nor closing member 52 displaced from stop portion 42. Because of the equal top-to-bottom dimensions of actuator and stop portions 42 and 74, switch mount 48 and closing member 52 are in contact with the upper and lower edges of both. In this neutral position, overhang portion 50 of closing member 52 is depressing switch button 63. This serves to close a circuit which enables ignition in case the should operator chose to start the drive engine.

Figure 6:
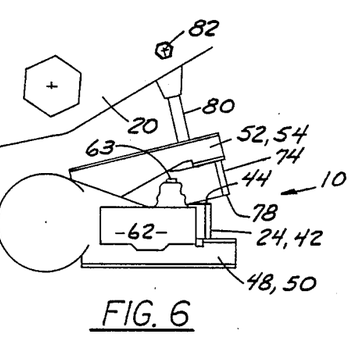
FIG. 6 is front schematic view of the device of FIGS. 1–4 in one ignition-disabling position, illustrating the device with the switch open because the drive control is in one of the out-of-neutral positions.

When control plate 20 is in its forward position, as illustrated in FIG. 6, actuator member 70 is pivoted in an upward direction and displaces closing member 52 away from first stop 44 of stop portion 42. Such displacement is against the biasing force of spring 56. While this occurs, switch mount 48 remains engaged with second stop 46. Such displacing action disengages overhang portion 53 of closing member 52 from switch button 63, thereby opening the circuit and disabling ignition such that the operator cannot start the drive engine.

Figure 8:
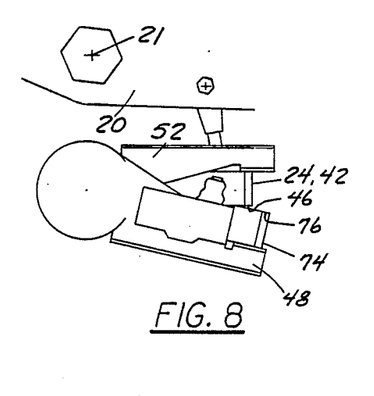
FIG. 8 is another similar schematic view, but showing another ignition-disabling position in which the switch is open because the drive control is in another out-of-neutral position.

When control plate 20 is in its reverse position, as illustrated in FIG. 8, actuator member 70 is pivoted in an downward direction and displaces switch mount 48 away from second stop 46 of stop portion 42. Such displacement is against the biasing force of spring 56. While this occurs, closing member 52 remains engaged with first stop 44. Such displacing action moves switch 62 away from overhang portion 53 of closing member 52 such that switch button 63 is no longer depressed. This also serves to open the circuit and disable ignition such that the operator cannot start the drive engine.

When control plate 20 is moved back to its neutral position from either its forward or its reverse position, coil spring 56 causes either closing member 52 or switch mount 48, as the case may be, to return to its position of engagement with stop portion 42 of s op member 24.

Figure 9:
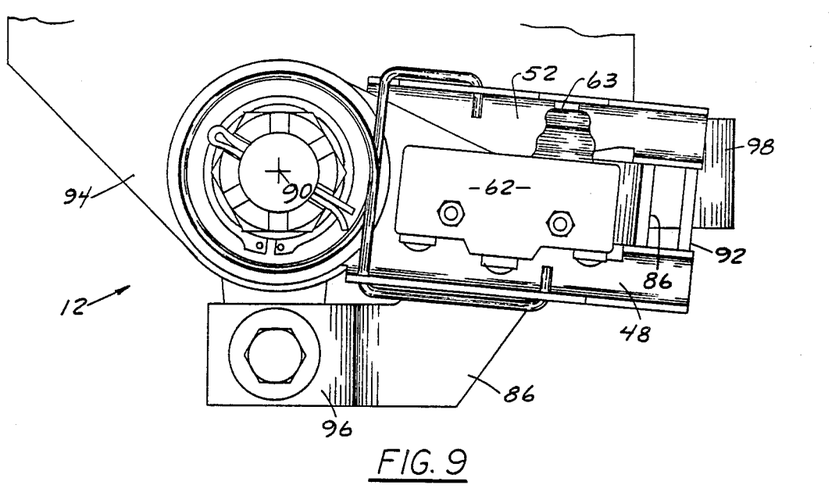
FIG. 9 is a front elevation of another embodiment of this invention.
Figure 10:
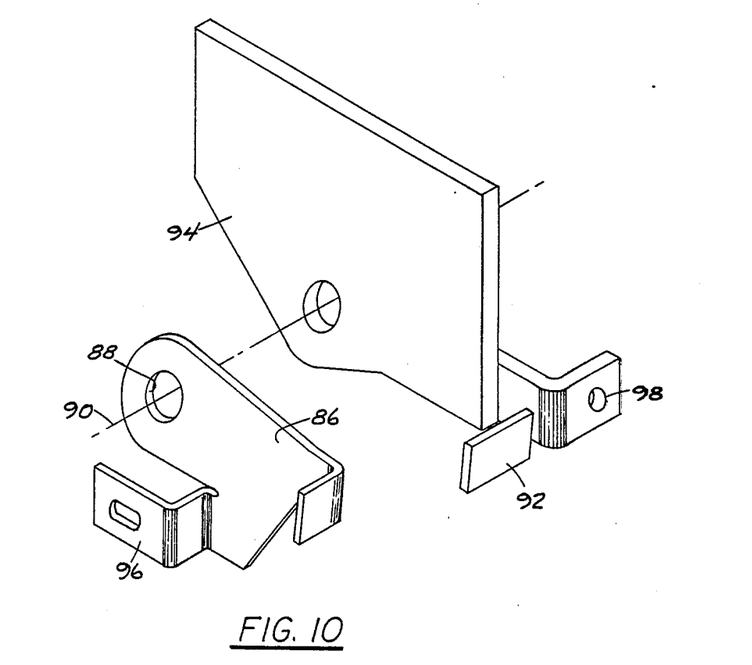
FIG. 10 is a reduced perspective view of the actuating mechanism of the device of FIG. 9, which is integral with the drive control.

As earlier noted, direct-mounted device 12, shown in FIGS. 9 and 10, differs from remote-mounted device 10 in its manner of connection to a drive control member. Because of their many similarities, only the differences between the two embodiments need be described.

An actuator piece 92, which is welded onto a control plate 94, is positioned and shaped to perform the functions of actuator portion 72 of device 10. Thus, actuator piece 92 serves to engage and displace either switch mount 48 or closing member 52 when control plate 94 moves out of its neutral position. In this way, the control member can be said to directly engage switch mount 48 and closing member 52.

Direct-mounted device 12 has a stop member 86 which differs from stop member 24. As shown best in FIG. 10, stop member 86 is a fixed member which has an opening 88 defining a pivot axis 90 about which switch mount 48 and closing member 52 pivot. Pivot axis 90 is also the pivot axis of control plate 94 in this embodiment of the invention. In this embodiment, therefore, control plate 94, switch mount 48, and closing member 52 all pivot about a common axis.

Stop member 86 has a securing portion 96 by which stop member 86 is secured against pivoting movement. Securing portion 96 is attached to nearby fixed tractor structure (not shown). Control plate 94 includes an attachment point 98 for its normal linkage to, for example, a variable displacement hydraulic pump.

Remote-mounted device 10 may be located near to or well away from its drive control. The nature of the linkage may be changed depending on its position on the vehicle.

The various pivoting and non-pivoting members of devices 10 and 12 which are adjacent to one another have appropriate washers, snap rings, spacers and the like between to assure proper operation. Detailed descriptions of these are not needed. The ignitio- enablement-disablement devices specifically disclosed herein, and other embodiments of the invention which may differ from those disclosed in detail, may be made using materials and parts which are readily available. Appropriate choices with respect to parts and materials would be apparent to those skilled in the art who are made aware of this invention.

While the principles of this invention have been described in connection with specific embodiments, it should be understood clearly that these descriptions are made only by way of example and are not intended to limit the scope of the invention.

I claim:

1. In a device of the type having means for closing an ignition-enablement switch only if a drive control is in neutral position, the improvement comprising:
    a stop member having first and second stops;
    a switch mount movable between a position engaging the second stop and positions displaced therefrom;
    a closing member movable between a position engaging the first stop and positions displaced therefrom;
    the switch positioned on the switch mount such that it is closed by the closing member only when the closing member and switch mount are both in the stop-engaging positions;
    means biasing the switch mount and closing member toward the stop-engaging positions; and
    actuator means movable with the drive control between positions displacing the closing member and positions displacing the switch mount, through a position displacing neither.

2. The device of claim 1 wherein the actuator means comprises:
    an actuator member separate from the drive control; and
    a link arm between the drive control and the actuator member.

3. The device of claim 1 wherein the actuator means comprises a control member which is part of the drive control, the control member having a rigidly affixed actuator piece directly engageable with the switch mount and the closing member.

4. The device of claim 1 wherein the stop member is in fixed position.

5. The device of claim 4 wherein the first and second stops face in divergent opposite directions.

6. The device of claim 1 wherein:
    the closing member and the switch mount are both pivotable about a first pivot axis; and
    the first and second stops are radially first pivot axis, whereby displacement of the closing member and switch mount is by pivoting in opposite directions around the first pivot axis.

7. The device of claim 6 wherein:
    the stop member is in fixed position and has an opening defining the first pivot axis; and
    the first and second stops face in divergent opposite directions.

8. The device of claim 6 wherein the actuator means comprises an actuator member pivotable about the first pivot axis.

9. The device of claim 8 wherein:
    the stop member is in fixed position and has an opening defining the first pivot axis; and
    the first and second stops face in divergent opposite directions.

10. The device of claim 9 wherein: the stop member has a radially-extending major portion and a stop portion which is transverse thereto at a first radial distance and intersects pivot movements of the switch mount and the closing member; and
    the actuator member has a radially-extending major portion and an actuator portion which is transverse thereto at a second radial distance and intersects pivot movements of the switch mount and the closing member.

11. The device of claim 8 wherein:
    the actuator means comprises a control member which is part of the drive control;
    the control member is pivotable about the first pivot axis; and the control member has a rigidly affixed actuator piece directly engageable with the switch mount and the closing member.

12. The device of claim 11 wherein:
the stop member is in fixed position; and the first and second stops face in divergent opposite directions.

13. The device of claim 12 wherein:
the stop member has a radially-extending major portion and a stop portion which is transverse thereto at a first radial distance and intersects pivot movements of the switch mount and the closing member; and the actuator member has a radially-extending major portion and an actuator portion which is transverse thereto at a second radial distance and intersects pivot movements of the switch mount and the closing member.

14. The device of claim 8 wherein:
the drive control includes a control member pivotable about a second pivot axis which is spaced from the first pivot axis; and
the actuator means includes a link arm between the control member and the actuator member.

15. The device of claim 14 wherein:
The stop member is in fixed position and has an opening defining the first pivot axis; and
the first and second stops face in divergent opposite directions.

16. The device of claim 15 wherein:
the stop member has a radially-extending major portion and a stop portion which is transverse thereto at a first radial distance and intersects pivot movements of the switch mount and the closing member; and the actuator member has a radially-extending major portion and an actuator portion which is transverse thereto at a second radial distance and intersects pivot movements of the switch mount and the closing member.

17. The device of claim 1 wherein the switch is adjustably attached to the switch mount, thereby allowing sensitivity adjustments.

18. In device of the type having means for closing an ignition-enablement switch only if a drive control is in neutral position, the improvement comprising:
a stop member having first and second stop surfaces;
a switch-mounting member movable with respect to the stop member between a position engaging the second stop surface and displaced positions spaced therefrom;
a switch-closing member movable with respect to the stop member between a position engaging the first stop surface and displaced positions spaced therefrom;
the switch positioned on the switch-mounting member such that it is closed by the closing member only when the switch-closing and switch-mounting member are in contact with the first and second stop surfaces, respectively;
means biasing the switch-mounting and switch-closing members toward contact with the stop member; and
actuator means movable with the drive control between positions displacing the switch-closing member to its displaced positions and positions displacing the switch-mounting member to its displaced positions.

* * * * *

UNITED STATES PATENT AND TRADEMARK OFFICE
CERTIFICATE OF CORRECTION

PATENT NO. : 4,895,053

DATED : January 23, 1990

INVENTOR(S) : John M. Moffitt

It is certified that error appears in the above-identified patent and that said Letters Patent is hereby corrected as shown below:

In column 3, line 29, change "membe" to --member--.

In column 7, line 54, change "ignitio-" to --ignition--.

In claim 6, line 4, after "radially", insert --spaced from--.

In claim 10, the paragraphing is incorrect. In line 1, the paragraph should end after the word "wherein:" and a new paragraph should start with the words "the stop member".

In claim 12, the paragraphing is incorrect. In line 2, the paragraph should end after the word "and" and a new paragraph should start with the words "the first and".

In claim 15, line 2, change "The" to --the--.

Signed and Sealed this

Eleventh Day of December, 1990

Attest:

HARRY F. MANBECK, JR.

*Attesting Officer*     *Commissioner of Patents and Trademarks*